United States Patent
Sippl

(10) Patent No.: US 11,208,038 B2
(45) Date of Patent: Dec. 28, 2021

(54) METHOD FOR OPERATING A MOTOR VEHICLE

(71) Applicant: AUDI AG, Ingolstadt (DE)

(72) Inventor: Christoph Sippl, Beratzhausen (DE)

(73) Assignee: AUDI AG, Ingolstadt (DE)

( * ) Notice: Subject to any disclaimer, the term of this patent is extended or adjusted under 35 U.S.C. 154(b) by 321 days.

(21) Appl. No.: 16/333,718

(22) PCT Filed: Sep. 13, 2017

(86) PCT No.: PCT/EP2017/072988
§ 371 (c)(1),
(2) Date: Mar. 15, 2019

(87) PCT Pub. No.: WO2018/050680
PCT Pub. Date: Mar. 22, 2018

(65) Prior Publication Data
US 2019/0225145 A1    Jul. 25, 2019

(30) Foreign Application Priority Data

Sep. 16, 2016    (DE) .......................... 102016217779.6

(51) Int. Cl.
*G08G 1/087*    (2006.01)
*B60Q 5/00*    (2006.01)
(Continued)

(52) U.S. Cl.
CPC .............. *B60Q 5/005* (2013.01); *B60Q 1/50* (2013.01); *B60W 30/10* (2013.01); *B60W 40/08* (2013.01);
(Continued)

(58) Field of Classification Search
CPC ...... B60Q 5/005; B60Q 1/50; B60Q 2400/50; B60W 30/10; B60W 40/08;
(Continued)

(56) References Cited

U.S. PATENT DOCUMENTS

| 8,330,622 B2 | 12/2012 | Stahlin |
| 9,224,294 B1 | 12/2015 | St. John |

(Continued)

FOREIGN PATENT DOCUMENTS

| CN | 202058308 U | 11/2011 |
| CN | 104648383 A | 5/2015 |

(Continued)

OTHER PUBLICATIONS

International Search Report and Written Opinion of the International Searching Authority directed to related International Patent Application No. PCT/EP2017/072988, dated Jan. 10, 2018, with attached English-language translation; 27 pages.

(Continued)

*Primary Examiner* — Hunter B Lonsberry
*Assistant Examiner* — Daniel M. Robert
(74) *Attorney, Agent, or Firm* — Sterne, Kessler, Goldstein & Fox P.L.L.C.

(57) ABSTRACT

The present disclosure relates to a method for operating a motor vehicle, wherein a status information regarding the status of an occupant of the motor vehicle is determined, whereupon the motor vehicle is guided in a fully automated manner to a predetermined target position when one of the release conditions is fulfilled as a function of the status information, wherein, when the release condition is fulfilled, the motor vehicle is guided independently of at least one traffic rule, which restricts the driving operation of the motor vehicle in the event of non-compliance with the release condition, or dependently of a modified version of said traffic rule.

12 Claims, 2 Drawing Sheets

(51) Int. Cl.
*B60W 30/10* (2006.01)
*B60W 40/08* (2012.01)
*B60Q 1/50* (2006.01)
*B60K 28/06* (2006.01)

(52) U.S. Cl.
CPC ........ *B60K 28/066* (2013.01); *B60Q 2400/50* (2013.01); *B60W 2040/0818* (2013.01); *B60W 2540/26* (2013.01); *B60W 2555/60* (2020.02); *B60W 2556/45* (2020.02); *B60W 2556/55* (2020.02)

(58) Field of Classification Search
CPC ........ B60W 2555/60; B60W 2556/45; B60W 2556/55; B60W 2040/0818; B60W 2540/26; B60W 2540/221; B60W 60/007; B60K 28/066; G08G 1/087; G08G 1/0965; A61B 5/747
See application file for complete search history.

(56) References Cited

U.S. PATENT DOCUMENTS

| | | | | |
|---|---|---|---|---|
| 9,599,986 | B1* | 3/2017 | Eberbach | G05D 1/0061 |
| 9,904,375 | B1* | 2/2018 | Donnelly | G05D 1/00 |
| 2003/0204290 | A1* | 10/2003 | Sadler | G06K 9/00362 |
| | | | | 701/1 |
| 2014/0135598 | A1* | 5/2014 | Weidl | A61B 5/163 |
| | | | | 600/301 |
| 2015/0066284 | A1* | 3/2015 | Yopp | B60W 50/10 |
| | | | | 701/29.2 |
| 2015/0149023 | A1* | 5/2015 | Attard | B60R 16/037 |
| | | | | 701/28 |
| 2016/0016467 | A1* | 1/2016 | Mathissen | B60K 28/063 |
| | | | | 123/179.3 |
| 2016/0200317 | A1 | 7/2016 | Danzl et al. | |
| 2016/0303967 | A1* | 10/2016 | Quix | B60K 28/063 |
| 2016/0321024 | A1* | 11/2016 | Jin | G06F 3/147 |
| 2016/0325528 | A1* | 11/2016 | Berard | G02B 6/0065 |
| 2016/0368491 | A1 | 12/2016 | Hauler et al. | |
| 2017/0305332 | A1* | 10/2017 | Albou | F21S 41/16 |
| 2017/0364069 | A1* | 12/2017 | Colella | A61B 5/0022 |
| 2018/0053411 | A1* | 2/2018 | Wieskamp | G08G 1/087 |

FOREIGN PATENT DOCUMENTS

| | | | |
|---|---|---|---|
| CN | 105358396 A | 2/2016 | |
| CN | 105473408 A | 4/2016 | |
| DE | 102008038492 A1 | 2/2009 | |
| DE | 102008037883 A1 | 4/2009 | |
| DE | 102009016936 A1 | 11/2009 | |
| DE | 102011109564 A1 | 2/2013 | |
| DE | 102011109618 A1 | 2/2013 | |
| DE | 102012008090 A1 | 10/2013 | |
| DE | 102013008545 A1 | 11/2014 | |
| DE | 102014217453 A1 | 3/2015 | |
| DE | 102013016436 A1 * | 4/2015 | ........... B60W 50/12 |
| DE | 102014011811 A1 | 2/2016 | |
| WO | WO-2011111056 A1 | 9/2011 | |

OTHER PUBLICATIONS

Winter, Michael, "Tempolimit—na und? In diesen Fallen dürfen Sie schneller fahren als erlaubt," available at https://www.focus.de/auto/experten/winter/zu-schnell-unterwegs-kann-erlaubt-sein-tempolimit-na-und-in-diesen-faellen-duerfen-sie-schneller-fahren-als-erlaubt_id_4546747.html, with attached English-language translation; 6 pages.
International Preliminary Report on Patentability directed to related International Patent Application No. PCT/EP2017/072988, dated Mar. 19, 2019, with attached English-lauguage translation; 16 pages.

* cited by examiner

METHOD FOR OPERATING A MOTOR VEHICLE

TECHNICAL FIELD

The present disclosure relates to a method for operating a motor vehicle, an item of state information that relates to the state of an occupant of the motor vehicle being determined, according to which information the motor vehicle is guided in a fully automated manner to a specified target position when a release condition that is dependent on the state information is met. The present disclosure relates in addition to a motor vehicle.

BACKGROUND

It is known to provide devices in motor vehicles that monitor vital signs of a vehicle occupant. For example, DE 10 2011 109 564 A1 discloses automatically parking a vehicle on the roadside or autonomously driving the vehicle to the closest emergency facilities, for example the casualty unit of a hospital, depending on the vital signs.

DE 10 2013 016 436 A1 discloses guiding a motor vehicle to a safe parking region in the event of the driver being incapable of driving the motor vehicle. In this case, it is also possible to continue the autonomous driving mode directly as far as a final destination at which medical care for the driver is possible, in particular as far as a hospital.

A further option for assisting a driver depending on his state is known from DE 10 2014 217 453 A1. In this case, a server is provided which communicates with a computer on the motor vehicle side and specifies measures for assisting the vehicle operator following notification of an impairing state of the operator. For example, the server may instruct the vehicle to drive in an autonomous mode to a pre-selected medical emergency facility or to a meeting place with the emergency services.

In emergency situations, it is often essential to provide an occupant of the motor vehicle with medical help as quickly as possible. In particular in the case of heart attacks or strokes, any delay in medical help may be potentially disadvantageous for the later health of an occupant. While the procedures mentioned already contribute to being able to provide medical help quickly, they still need to be improved.

BRIEF DESCRIPTION OF THE DRAWINGS/FIGURES

DETAILED DESCRIPTION

Figure 1:
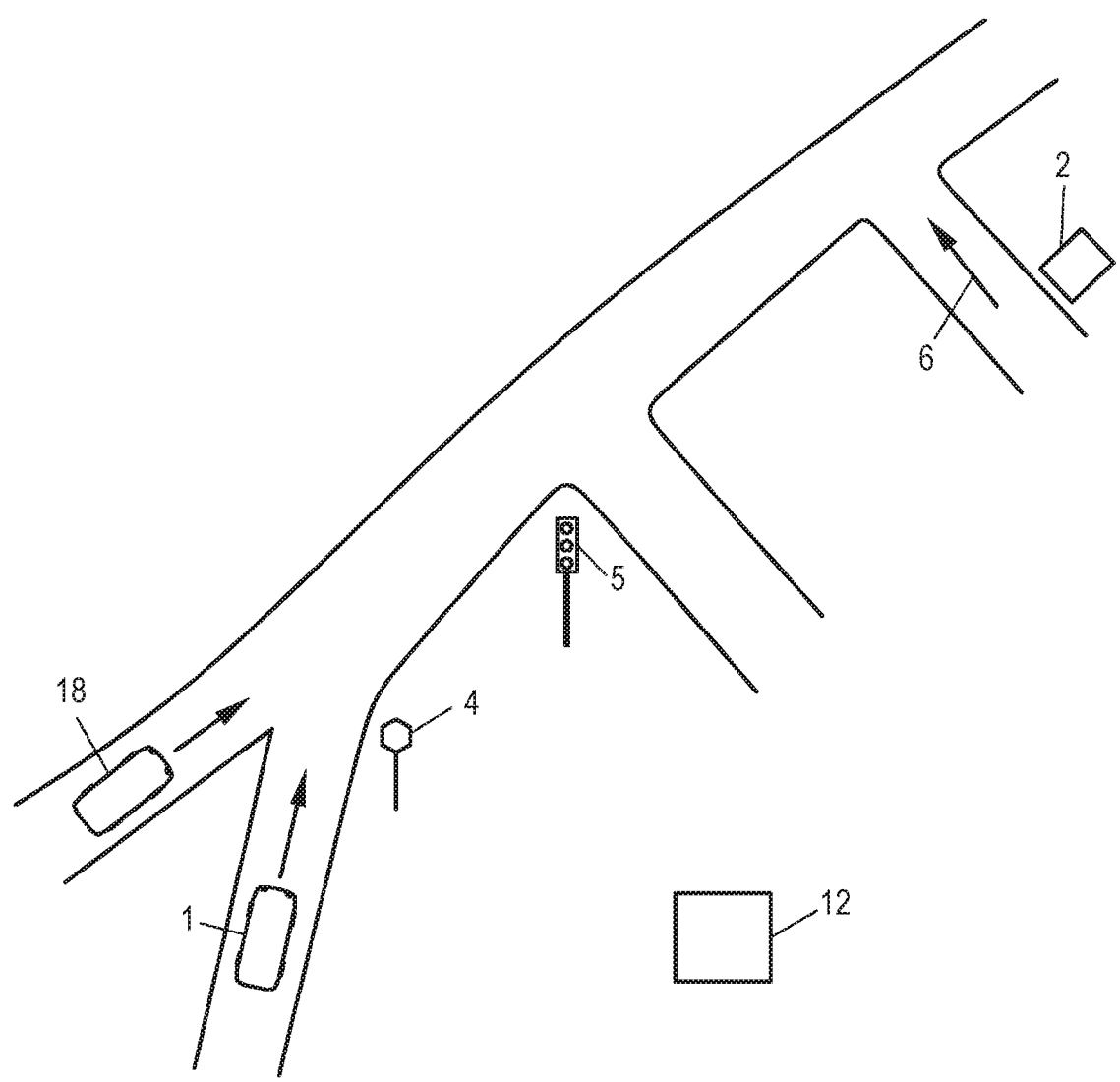
FIG. 1 illustrates a schematic of a situation in which an embodiment of the method according to the present disclosure is carried out.

The object of the present disclosure is therefore that of improving the corresponding methods such that it may be possible to achieve quicker medical help.

This object is achieved according to the present disclosure in that, in a method of the type mentioned at the outset, if the release condition is met, the motor vehicle is guided in a manner independent of at least one traffic regulation which restricts the driving mode of the motor vehicle when the release condition is not met, or on the basis of a modified version of the traffic regulation.

According to the present disclosure it is thus proposed to allow for particular traffic regulations to be broken or modified, within the context of the fully automated guidance to the target position, if a corresponding release condition is met, i.e., in particular in emergency situations. For example, it may be made possible, in this case, for the motor vehicle, within the context of the fully automated guidance, to exceed speed limits, jump red lights and/or stop signs, drive the wrong way up one-way streets, overtake in no-passing zones, and the like, provided that the traffic situation allows. For example, within the context of the fully automated guidance, the motor vehicle may be granted similar rights to those granted to an ambulance in the case of a journey having special rights, i.e., in the case of a blue-light journey. As a result, a target position, and thus medical help, can be reached more quickly in emergency situations.

If the release condition is not met, the guidance of the motor vehicle should be such that the traffic regulations are complied with. Compliance with the traffic regulations may be ensured by technical means, in particular in the case of assisted, partially automated, or highly or fully automated guidance of the motor vehicle. For example, an intervention can be made in the longitudinal guidance of the motor vehicle in such a way that specified maximum speeds are not exceeded, the motor vehicle is stopped automatically in specific traffic situations, for example at red lights, or the like. If guidance of the motor vehicle takes place manually or if a driver can override driving interventions, the corresponding traffic regulations are of course to be complied with by the driver. The traffic regulations may for example be specified by legal norms or by road signs, changing lights, traffic lights, or the like.

The release condition can in particular assess the extent to which a driver is likely to be capable of driving and/or how time-critical it is to provide medical help for a driver. As a result, clearance for breaking the traffic regulations can take place only when there actually is an emergency situation. The release condition may in addition depend on further constraints, for example the time it would take to provide medical help at a current position of the motor vehicle. This may depend for example on the location of emergency vehicles in the surroundings of the motor vehicle.

The release condition can be evaluated by a controller of the motor vehicle. It is particularly advantageous, however, if the release condition is evaluated outside the vehicle, for example in a central facility, in particular in an emergency call center. The release condition can be evaluated in an automated manner, for example by means of a computing device. It is also possible, however, for the meeting of the release condition to be dependent on operator commands of a user. The state information can be made available to the user at least in part, in particular displayed visually and/or output acoustically, on the basis of which the user can decide whether the release condition is met or whether a partial condition is met, the release condition being dependent on said partial condition being met.

In a simple example, the state information may be a voice message of the occupant spoken within the context of an emergency call. For example, the occupant may trigger a telephonic emergency call by means of a communications device on the motor vehicle side or a mobile communications device. An evaluator can evaluate the voice message, if necessary ask the occupant further questions, and assess whether the situation is an emergency. If there is a corresponding emergency, this alone may suffice for triggering the release condition. In addition, however, a manual or automated check may be made as to whether fully automatic guidance of the motor vehicle to the target position, for example to a hospital, is actually expedient, or whether it would for example be more advantageous to take an ambulance to the current motor vehicle position, and therefore no release should take place on the motor vehicle. Alternatively or in addition, it is possible for sensor data, for example from sensors that record vital signs of the occupant, to be recorded and evaluated within the context of the release condition, in order to evaluate the release condition. This can take place manually, in a fully automated manner, or in a partially automated manner. Methods for recording and evaluating corresponding sensor data are known in the prior art, for example from the documents mentioned at the outset, and will therefore not be explained in detail.

The designation of the different automation levels for a motor vehicle is made in the present application in accordance with the designations published by the German Federal Highway Research Institute (BASt) in the article "Rechtsfolgen zunehmender Fahrzeugautomatisierung" [Legal consequences of increasing vehicle automation], Forschung kompakt 11/12. In this case, in assisted operation only transverse or longitudinal guidance of the motor vehicle takes place. In the case of partial automation, a motor vehicle system takes over both the transverse and the longitudinal guidance. In this case, however, continuous monitoring of the system by a driver is required. In the case of high or full automation, continuous monitoring of this kind is not required. The difference between these two automation levels is that, in the case of full automation, it is necessary to always ensure that the system can return the motor vehicle into a minimal-risk system state, for example can safely park the motor vehicle, without driver intervention. This is not required in highly automated guidance.

The traffic regulations may specify a maximally permissible vehicle speed of the motor vehicle, and/or the practicability of particular regions for the motor vehicle, and/or stopping of the motor vehicle at specific positions, in a continuous manner and/or a manner dependent on the travel situation. The individual specifications may in particular be location-dependent, for example relate to a speed limit in a road portion on which the vehicle is driving, or stopping at specified points in the case of the presence of traffic lights, stop signs, or in specific right-of-way situations. For particular regions, the practicability may be fundamentally restricted. For example, the traffic regulations may specify that the motor vehicle may not be guided onto bus lanes or through pedestrian zones. The practicability may, however, also be situation-dependent. For example, the traffic regulations may specify that traffic may not drive counter to the traffic direction in a one-way street, or a situation-dependent restriction on driving in particular regions may result from a restriction on overtaking. In the method according to the present disclosure, all or some of the traffic regulations mentioned may be broken when the release condition is met. Of course, the fully automated guidance of the motor vehicle takes place in this case such that corresponding traffic regulations are broken only if the current traffic situation permits. Not respecting or modifying the traffic regulations can result in quicker guidance of the motor vehicle to the target position.

A device on the motor vehicle side or a mobile communications device can record the state information and transmit the information to a central unit, after which the release condition is checked by the central unit or by an evaluator on the central unit side, a release signal being transmitted to the motor vehicle if the release condition is met, the motor vehicle being guided to the target position in a fully automated manner, independently of the traffic regulations or on the basis of the modified version of the traffic regulations, following receipt of the release signal. This situation has already been discussed at the outset. Using a central unit for evaluating the release condition is particularly advantageous if an evaluator is consulted in order to evaluate the release condition or a partial condition on which said release condition depends. If an emergency call center, for example, is used as the central unit, the state information can be assessed by an independent evaluator who is experienced in assessing possibly medically relevant states of people. Using a central unit may also be advantageous, however, if the state information is evaluated fully automatically. In this case, the aggregation of information from various sources can be facilitated. For example, the positions and/or the occupancy of emergency vehicles may be known in the central unit, with the result that it is possible to make a particularly good assessment, within the context of the evaluation of the release condition, as to whether it is at all expedient, in the situation in question, to guide the motor vehicle for example to a hospital, or whether it is more expedient to guide other assistance to the motor vehicle.

If a central unit is used, it is advantageously also possible for the target position to be determined by the central unit or an evaluator on the central unit side, and transmitted to the motor vehicle. For example, one of a plurality of hospitals to which the occupant is to be taken may be selected on the basis of the state information, or it may be determined that it is expedient not to guide the motor vehicle directly to the hospital but instead to a meeting point with an emergency vehicle at a specified position.

In addition to the state information, an item of ID information that identifies the motor vehicle and/or the occupant and/or a vehicle owner of the motor vehicle and/or a place of residence of the occupant and/or of the vehicle owner can be determined, it being possible for the target position and/or the meeting of the release condition to be dependent on the ID information, and/or it being possible for one of a plurality of motor vehicles to be selected, on the basis of the ID information, to which vehicle the release signal can be transmitted and which vehicle can be guided to the target position.

Identification of the motor vehicle is relevant in particular if a central unit is used for evaluating the release condition. Identification of individual motor vehicles allows for the central unit to be used simultaneously or sequentially for different motor vehicles. Identification of the relevant motor vehicle is easily possible in situations in which the state information is transmitted via a device on the motor vehicle side. In this case, associated ID information, for example a vehicle ID or the number plate of the motor vehicle, can be transmitted together with the state information. If a mobile communications device is used for transmitting the state information, it is possible for example for the relevant occupant to be explicitly identified and for a corresponding identification to be transmitted. It is also possible, however, for an item of ID information for the mobile communications device to first be determined, for the mobile communications device to be associated with a specific user, and for it to be assumed that the user is the occupant. Alternatively or in addition, in order to identify in the motor vehicle it is possible for example to ascertain an item of position information for the mobile communications device and for the motor vehicle, and to ascertain, on the basis of the respective items of position information, which of the motor vehicles is occupied by the occupant.

It is often expedient, within the context of evaluating the state information, to know who the occupant is. Identifying the identity of the occupant early on can also be advantageous within the context of subsequent medical treatment. In addition to an explicit identification of an occupant, it is also possible to determine a likely identity of the occupant from various indicators. It may be assumed, for example, that the occupant is the vehicle owner of the identified motor vehicle, or a registered user of the mobile communications device. Another option for identifying the occupant is that the occupant is the driver of the motor vehicle, for example a personalized vehicle key being used or the driver selecting a corresponding driver profile in order to identify himself to the motor vehicle. Places of residence can be evaluated for example together with movement profiles of the motor vehicle or of the mobile communications device, in order to identify the occupant. Taking account of the place of residence can in addition take place in particular within the context of determining the target position. If, for example, a plurality of hospitals can be reached in a similar time, the hospital that is closer to the place of residence of the occupant can be favored.

The ID information may be taken into account within the context of evaluating the release conditions for example by means of historical information relating to vital signs of the occupant being compared with current values provided within the scope of the occupant information, in order to determine whether there is an emergency. For example, historical values for blood pressure or pulse may be stored.

In the method according to the present disclosure it is possible for an updated target position to be transmitted to the motor vehicle by the central unit or a third-party unit, during fully automated guidance of the motor vehicle to the target position, after which transmission the fully automated guidance is continued such that the motor vehicle is guided to the updated target position. The third-party unit may for example be an emergency call center or an ambulance. The adjustment makes it possible to specify a new destination if the original target position can be reached by the motor vehicle only with difficulty, for example because of a traffic jam. If the original target position represented a meeting point with an ambulance or other possible assistance, for example, it is also possible to adjust the target position if the ambulance or the assistance cannot reach the original target position or can reach the position only significantly later than originally predicted.

Within the context of the method according to the present disclosure, an anticipated arrival time of at least one possible means of assistance at the current position of the motor vehicle, and/or an anticipated time duration until the assistance reaches the current position may be determined. The release condition may be determined depending on the arrival time and/or on the time duration. The possible assistance may for example be an ambulance or an emergency doctor. The release condition may for example be met only if the arrival time and/or the time duration has exceeded a threshold value, and/or if a predicted time for the motor vehicle reaching a target position at which help is possible is shorter than the time duration until the possible assistance arrives. Alternatively or in addition, it is possible for an optimal meeting location for the motor vehicle and the relevant assistance to be determined by means of determining a position that both the motor vehicle and the possible assistance can reach in a minimal time.

If the release condition is met, at least one communications device of the motor vehicle may be activated in order to allow for communication between the occupant and the central unit and/or a third-party unit outside the vehicle. The third-party unit may be the third-party unit mentioned above, or another third-party unit. The communications device may in particular remain active throughout the entire process of guidance to the destination. The communications device may for example comprise at least one microphone and at least one loudspeaker in the interior of the motor vehicle. This makes it possible for the vehicle occupant to be able to communicate for example with an emergency call center or other assistance during the automated guidance.

After the release condition has been met, at least one notification means of the motor vehicle can be actuated in order to provide other road users with an acoustic and/or optical notification of the fully automated driving mode that takes place independently of the traffic regulations or on the basis of the modified version of the traffic regulations. A corresponding notification can be given in particular during the entire fully automated driving mode to the destination. Since at least some traffic regulations can be broken during the fully automated driving mode, it is expedient to alert other road users to this.

At least one planar illumination element comprising an illumination surface facing the vehicle surroundings may be actuated as a notification means, with the result that an illumination color and/or an illumination intensity of at least one portion of the illumination element, and/or a pattern displayed by the illumination element, can be changed once or repeatedly. For example, a bodywork portion, a window portion or another outside portion of the vehicle can be used as the illumination surface.

In addition or alternatively, a headlight can be actuated as a notification means, a specified symbol being projected into the motor vehicle surroundings. The symbol may in particular be projected onto the carriageway surface. The symbol can be projected so as to be fixed relative to the motor vehicle. It is also possible, at least in the event of it being determined, for example from navigation data, that the motor vehicle is located in the region of a marked route portion, for example an intersection, a T-junction or a pedestrian crossing, for the symbol or an additional symbol to be projected so as to be fixed relative to the corresponding route portion.

A cross, for example, may be projected as the symbol. The projection may be single-colored or multicolored. A projection may take place in particular using a laser on the motor vehicle side. The laser can be used to display the symbol in a deflected manner, for example by means of a revolving mirror, or a diffraction grating may be used to display the symbol. It is alternatively possible to use other headlights in order to project said symbol, for example headlights that can display patterns using a plurality of LEDs, an in particular dynamically adjustable mask in the beam path, a micromirror array, or the like. A dynamic mask can be achieved for example by an LCD panel.

It is also possible for at least one loudspeaker of the motor vehicle, which emits into the vehicle surroundings, to be actuated as a notification means, as a result of which an acoustic notification signal is continuously or repeatedly emitted into the motor vehicle surroundings. Loudspeakers of this kind are in any case frequently provided for example in electric vehicles, in order to emit a simulated driving noise into the surroundings and thus make pedestrians, for example, aware of the motor vehicle. Within the context of the method, corresponding loudspeakers can be actuated in order to emit specific noises, sounds and/or sound mixtures, or in particular periodic sequences thereof, to the surroundings as a notification. For example, an ongoing warning signal or a tone that can be changed in a siren-like manner, can be emitted.

Hazard lights of the motor vehicle can also be actuated as a notification means, as a result of which a plurality of illumination means associated with the hazard lights flash in a specified rhythm. This is advantageous because other road users are accustomed to reacting to corresponding hazard lights as a notification. In order to make it clear that this is a specific warning, or a notification of a particular driving mode, a particular flash rhythm may be specified which for example comprises a plurality of successive flash intervals at different temporal spacings, or the like.

The notifications explained above are particularly suitable for alerting for example pedestrians or vehicle drivers to the driving mode of the motor vehicle. It may be desirable, however, to carry out particular technical control operations for infrastructure facilities or other vehicles depending directly on a corresponding notification. It is therefore possible, in the method according to the present disclosure, for the motor vehicle and/or the central unit to send at least one notification message to at least one further motor vehicle or to at least one set of traffic lights, during the fully automated driving mode to the target position, at least one motor vehicle unit of the further motor vehicle and/or the traffic lights being controlled on the basis of the receipt of notification message. Corresponding notification messages can in particular be transmitted to traffic lights or to further motor vehicles in the surroundings of the motor vehicle. The notification message can preferably comprise further information, for example a planned trajectory of the motor vehicle, such that said information can be taken into account within the context of controlling the further motor vehicle and/or the traffic lights.

The control of the motor vehicle unit can be carried out in such a way that the further motor vehicle adapt its own trajectory in order to allow the motor vehicle that is guided in a fully automated manner to overtake quickly. Alternatively or in addition it is possible for notification means to be actuated as motor vehicle units, upon receipt of the notification message, in order to instruct a driver of the further motor vehicle about the fully automated driving mode and the high priority of the guidance of the motor vehicle driving in the fully automated mode.

A set of traffic lights can for example be controlled such that potentially impeding further traffic is stopped or such that the motor vehicle guided in a fully automated manner is able to overtake in a green phase. The various control interventions can thus accelerate the guidance of the motor vehicle to a target position, and in particular the medical care of the occupant.

In addition to the method according to the present disclosure, the present disclosure also relates to a motor vehicle comprising a device on the motor vehicle side, it being possible, when the release condition is met, for the motor vehicle to be guided to the destination in a fully automated manner by the device on the motor vehicle side, in accordance with the method according to the present disclosure. The motor vehicle according to the present disclosure can be developed such that individual or all variants of the method described above can be carried out. For this purpose, the motor vehicle may in particular comprises sensors for recording a driver state. Furthermore, the motor vehicle may comprise a communications device for communication with a central unit and/or with further motor vehicles or with traffic lights. In addition, at least one of the notification means explained above may be provided, which means can provide further road users with an acoustic and/or optical notification.

Figure 2:
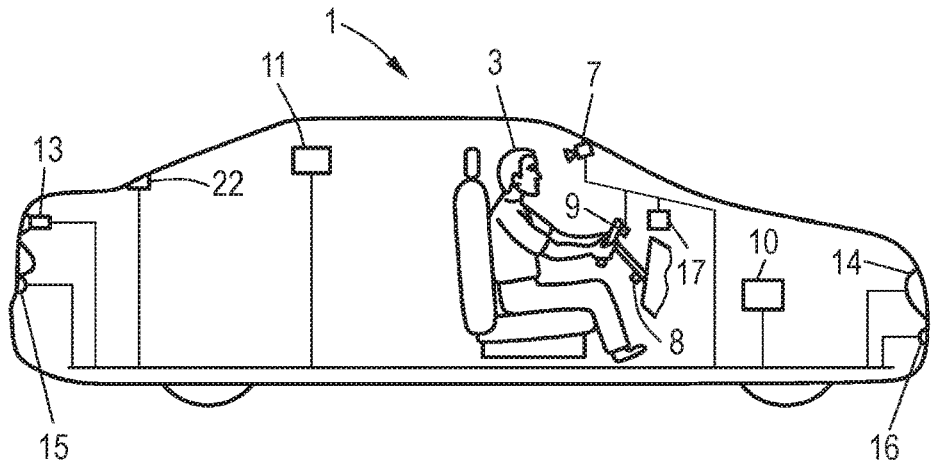
FIG. 2 illustrates a schematic representation of a motor vehicle, according to one embodiment of the present disclosure.
Figure 3:
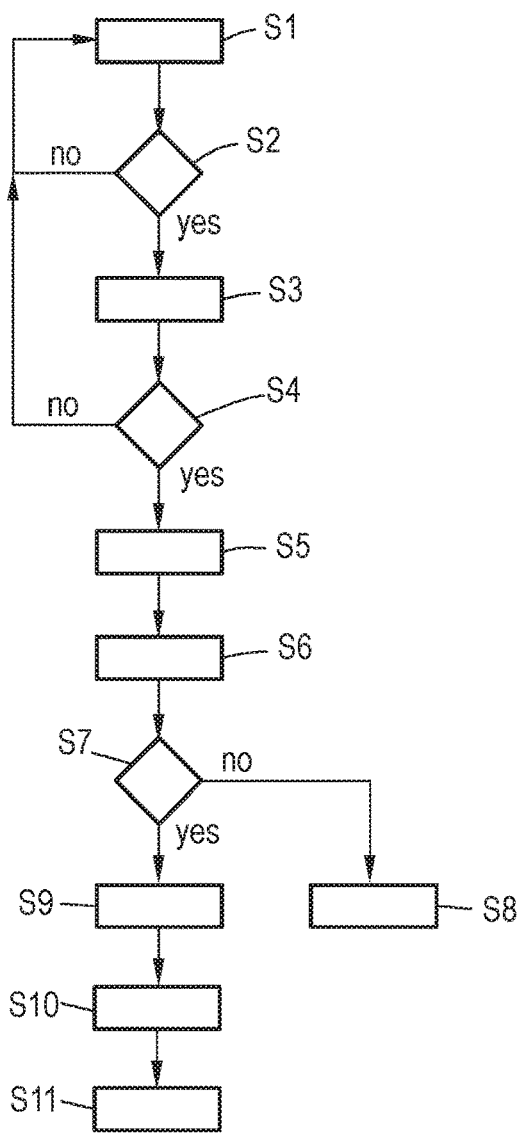
FIG. 3 illustrates a flow diagram of a method, according to one embodiment of the present disclosure.

Referring now to the drawings, FIG. 1 shows a traffic situation in which a motor vehicle 1 is guided in a fully automated manner to a target position 2, depending on an occupant state. The structure of the motor vehicle 1 is shown in FIG. 2. The following explanation makes reference to FIG. 3 which is a flow diagram of the method.

In step S1, normal driving mode of the motor vehicle 1 take place. In this case, the motor vehicle 1 may be guided manually by the occupant 3 or the guidance may take place in an assisted or at least partially automated manner. In this case, the guidance of the motor vehicle 1 takes place in accordance with specified, in particular legally specified, traffic regulations. The regulations specify a permissible driving speed for the motor vehicle 1, in each case, through the route portion on which the motor vehicle 1 is currently driving. In addition, the traffic regulations may specify that the motor vehicle should stop at particular positions and/or in particular travel situations. For example, the motor vehicle must stop at a stop line (not shown) upon reaching the stop sign 4, and upon reaching the traffic lights 5 the motor vehicle would have to stop if said traffic lights are red. It is also possible for the traffic regulations to restrict the practicability of specific regions. For example, the street 6 marked with an arrow in the specified travel direction is a one-way street. When the motor vehicle is operated according to the traffic regulations, it is not possible to travel in the region counter to the travel direction. The traffic regulations are adhered to by the occupant 3 during a manual driving mode of the motor vehicle 1. It is also possible for driver assistance systems of the motor vehicle 1 to intervene in the driving mode in order to assist or ensure compliance with said traffic regulations.

During the driving mode of the motor vehicle 1, a state of the occupant 3 is recorded by a plurality of sensors 7, 8, 9 in order to determine state information that describes the state. The sensor 7 is a camera, the sensor 8 records steering movements of the occupant 3, and the sensor 9 can record vital signs of the occupant 3, for example a pulse and a skin resistance and surface temperature of the skin, by means of monitoring the gripping region of the steering wheel.

On the basis of the sensor data, in step S2 the occupant state of the occupant 3 is classified by means of a device 10 on the motor vehicle side, and on the basis of this classification a determination is made as to whether the occupant 3 may require medical help. If this is not the case, the method is repeated from step S1.

If it is determined that the occupant 3 may require medical help, in step S3 the device 10 on the motor vehicle side transmits state information, describing the state of the occupant 3, to the central unit 12 via the communications device 11. The state information may comprise the previously recorded sensor data or data derived therefrom. In addition, ID information identifying the motor vehicle 1 can be transmitted in order to allow the central unit 12 to purposefully address the motor vehicle 1. It is additionally possible for ID information identifying the occupant 3 to be transmitted. The ID information may be used for example within the context of evaluating the state information, in order to compare values recorded by sensors with historical values, for example for the pulse of the occupant 3. Corresponding occupant ID information may be known if the occupant 3 is the driver and is using a personalized vehicle key and/or has selected a corresponding driver profile that is assigned to the driver.

The explanation hitherto assumes that the classification of the occupant state and the transmission of corresponding state information takes place automatically and on the basis of sensor data. In an alternative embodiment, however, it would be possible for the state information to be transmitted manually or at least with the involvement of the occupant 3 or of a further vehicle occupant. For example, the occupant 3 or a further occupant may actuate an operating element of the motor vehicle 1 in order to trigger the transmission of the state information. In this case, in the simplest case the fact that there may be a possible medical emergency at all may be transmitted as state information. It is also possible, however, to further supplement this information, for example in that sensor data are recorded, as explained above, and/or in that further information relating to the state of the occupant 3 are provided by means of a dialogue system, and/or in that the state information are transmitted as a voice message within the context of an emergency call.

After the central unit 12 has received the state information, the central unit 12 checks, in step S4, whether medical help should be provided to the occupant 3. This can take place in a fully automated manner, on the basis of the state information. Methods for this are known in principle in the prior art and will not be explained in greater detail. It is also possible, however, for this check to be made entirely or in part by a human evaluator. This is advantageous for example if the state information is transmitted as speech within the context of an emergency call. If it is determined that no medical help is to be provided, for example because of a misinterpretation of the sensor data by the device 10 on the motor vehicle side or because an emergency call was triggered accidentally, the method is continued from step S1.

If, in contrast, medical help is to be provided for the occupant 3, in step S5 a target position 2 is first determined, at which corresponding help could be provided. For this purpose, map data may be stored in the central unit 12 and a closest position can be determined at which the help can be provided.

In step S6 a determination is made regarding the time at which, or after how long, assistance is likely to be possible at the current position of the motor vehicle 1. For this purpose, the central unit 12 may communicate with a plurality of emergency vehicles in order to record the position thereof. The stored map data can be used to determine, possibly taking account of the traffic situation, a likely duration until an emergency vehicle would reach the actual position of the motor vehicle. In addition, a time is calculated that the motor vehicle 1 would be likely to require in order to reach the target position 2. Within the context of the prediction, it is taken into account that the guidance of the motor vehicle could take place ignoring at least some of the traffic regulations, as will be explained in greater detail below.

In step S7, a time condition is evaluated, which condition is met if the time that would elapse until medical help was provided at the current position of the motor vehicle 1 is longer, by a specified threshold value, than the time that the motor vehicle 1 would require to reach the target position 2. If the time condition is not met, it is expedient to stop the motor vehicle 1 at the current position or not move the motor vehicle away from the current position, because medical help can be provided promptly at this position. Therefore, in step S8, the motor vehicle is parked at the current position and the method ends.

If it is determined, in contrast, that it is expedient to move the motor vehicle 1 to the target position 2 in a fully automated manner, the method is continued with step S9 in order to prepare for fully automated guidance to the target position 2. The conditions checked in step S4 and step S7 thus together form a release condition for the fully automated guidance of the motor vehicle 1 to the target position 2, which release condition is dependent both on the state information, specifically in step S4, and on a likely time duration until possible assistance reaches the current position of the motor vehicle 1, specifically in step S7. In an alternative variant of the method described, it would be possible for the release condition to depend exclusively on the state information and for the ability of possible assistance to reach the current position to thus be disregarded. It is also possible, in a further variant of the method, for the check of the release condition to take place in the motor vehicle 1 itself for example by means of the device 10 on the motor vehicle side.

In step S9, a release signal is first sent from the central unit 12 to the motor vehicle 1. After the communications device 11 has received the release signal, the device on the motor vehicle side is configured, in step S10, such that fully automated guidance of the motor vehicle 1 can subsequently take place, during which fully automated guidance at least one of the traffic regulations discussed above is ignored or modified. This accordingly makes it possible for the motor vehicle to be driven for example at a speed that is above the permissible driving speed and/or for the motor vehicle to pass the stop sign 4 or the traffic lights 5 without stopping, even in the event of the lights being red, and/or for the motor vehicle 1 to be driven counter to the traffic direction of the one-way street 6. In step S11, the motor vehicle 1 is subsequently guided to the target position 2. Flouting at least some of the traffic regulations allows the motor vehicle 1 to be guided to the target position 2 significantly more quickly than would be possible in normal driving mode.

In the method described, the motor vehicle 1 is guided such that contravention of traffic regulations is possible. This corresponds to the principle of guiding rescue vehicles having special rights, owing to which the rescue vehicles can ignore particular traffic regulations. Since corresponding guidance of the motor vehicle 1 is, however, unexpected for further road users, for example the further motor vehicle 18, it is advantageous to alert the further road users thereto. Therefore, after the release condition has been met, and in particular during the entire fully automated driving mode to the destination 2, the notification means 22, 13, and 14 and the hazard lights of the motor vehicle 1 can be actuated in order to provide an acoustic or optical notification of the fully automated driving mode. The notification means 22 is a planar illumination element comprising an illumination surface facing the vehicle surroundings. The illumination element may be actuated such that an illumination color and/or an illumination intensity of at least one portion of the illumination element, and/or a pattern displayed by the illumination element, can be changed once or repeatedly.

The notification means 14 is a headlight that can project a specified symbol into the motor vehicle surroundings in order to provide a notification of the corresponding driving mode. The projection can be achieved for example in that a laser is deflected sufficiently quickly for an apparently stationary image to result, or in that a pattern is generated by an actuatable LCD aperture or a micromirror array.

The notification means 13 is a loudspeaker which emits into the vehicle surroundings and which can continuously or repeatedly emit an acoustic notification signal into the motor vehicle surroundings. Furthermore, the illumination means 15, 16 of hazard lights of the motor vehicle can be actuated as a notification means, which illumination means flash in a specified rhythm during the operation in fully automated driving mode to the target position 2.

In order to further accelerate the guidance of the motor vehicle 1 to the target position 2, it is possible for the motor vehicle, specifically the communications device 11, to send notification messages to the further motor vehicle 18 and the traffic lights 5 during the operation in fully automated driving mode to the target position 2. Subsequently, a motor vehicle unit of the further motor vehicle 18 can be actuated in order to intervene in the driving mode such that the driving mode of the motor vehicle 1 is not impeded by the driving mode of the further motor vehicle 18. Alternatively, the motor vehicle device may be a notification means that emits a corresponding driving notification to a driver of the further motor vehicle 18. Following receipt of the notification message, the traffic lights can be controlled so as to switch to green for the motor vehicle 1 when the vehicle passes through, and to switch to red for road users turning or crossing. Although, as already explained, the motor vehicle 1 can also ignore a red phase of the traffic lights 5, other road users are already alerted, early on, to the fact that the motor vehicle 1 will drive through the corresponding region, by means of corresponding switching of the traffic lights.

Furthermore, during automated driving mode, a communications device 17 in the interior of the motor vehicle, for example a hands-free speaker phone, is automatically activated in order to allow the occupant 3 to communicate with an emergency services center.

In the description hitherto, it has been assumed that the target position 2 is a hospital. It is also possible, however, for the target position 2 to be selected such that particularly time-efficient meeting with possible assistance, for example an ambulance, is possible at said position. Additionally, the target position may also be adjusted during the fully automated guidance of the motor vehicle 1 to the target position 2. This is possible, for example, if another hospital is to be selected or if, for example owing to a traffic situation, a meeting point with an ambulance previously assessed as expedient is found not to be expedient.

The invention claimed is:

1. A method for operating a motor vehicle, the method comprising:
   determining state information relating to a state of an occupant of the motor vehicle;
   determining whether medical help is needed for the occupant based on the state information;
   transmitting, based on the determining that medical help is needed, the state information together with a request for an indication that a release condition is met, wherein meeting the release condition is determined based on the state information;
   receiving an indication that the release condition is met, and a specified target position based on the release condition; and
   guiding the motor vehicle in a fully automated manner to the specified target position upon receipt of the indication that the release condition is met;
   wherein guiding the motor vehicle in the fully automated manner to the specified target position comprises guiding the motor vehicle independent of at least one traffic regulation that restricts a driving mode of the motor vehicle, or guiding the motor vehicle based at least in part on a modified version of the at least one traffic regulation.

2. The method according to claim 1, wherein the at least one traffic regulation specifies at least one of a maximally permissible vehicle speed of the motor vehicle, a restriction of particular regions in which the motor vehicle can travel, or stopping of the motor vehicle at specific positions.

3. The method according to claim 1, further comprising:
   recording, by a device on the motor vehicle or a mobile communications device, the state information;
   transmitting, by the device on the motor vehicle or the mobile communications device, the recorded state information to a central unit, wherein the central unit is configured to check the release condition, and to transmit a release signal to the motor vehicle if the release condition is met; and
   receiving, by the motor vehicle, the release signal from the central unit;
   wherein guiding the motor vehicle in the fully automated manner to the specified target position comprises guiding the motor vehicle following receipt of the release signal.

4. The method according to claim 3, further comprising:
   determining an item of identification (ID) information that identifies at least one of the motor vehicle, an occupant of the motor vehicle, an owner of the motor vehicle, or a place of residence of at least one of the occupant of the motor vehicle or the owner of the motor vehicle; and
   determining the target position based at least in part on the ID information;
   wherein the central unit is configured to select the motor vehicle as a destination to which the release signal is transmitted based at least in part on the ID information.

5. The method according to claim 3, further comprising:
   receiving an updated target position from the central unit or a third-party unit while the motor vehicle is being guided in the fully automated manner to the target position; and
   guiding the motor vehicle in the fully automated manner to the updated target position upon receipt of the updated target position.

6. The method according to claim 1, further comprising determining at least one of an anticipated arrival time or a duration until arrival of at least one possible means of assistance at a current position of the motor vehicle, wherein the release condition is dependent on the at least one of the anticipated arrival time or the duration until arrival.

7. The method according to claim 1, further comprising activating at least one communications device of the motor vehicle when the release condition is met, the at least one communications device configured to allow for communication between an occupant of the motor vehicle and at least one of a central unit or third-party unit external to the vehicle.

8. The method according to claim 1, further comprising actuating at least one notification means of the motor vehicle when the release condition is met, the at least one notification means configured to provide other road users with at least one of an acoustic notification or an optical notification indicating that the motor vehicle is being guided in the fully automated manner.

9. The method according to claim 8, wherein the at least one notification means comprises at least one planar illumination element comprising an illumination surface facing surroundings of the motor vehicle, and wherein actuating the at least one notification means comprises actuating the at least one planar illumination element so that at least one of an illumination color, an illumination intensity, or a pattern displayed by the planar illumination element can be changed once or repeatedly.

10. The method according to claim 8, wherein the at least one notification means comprises at least one of a headlight of the motor vehicle configured to project a symbol to surroundings of the motor vehicle, a loudspeaker of the motor vehicle configured to emit sound into the surroundings of the motor vehicle, or hazard lights of the motor vehicle configured to project a flash in a specified rhythm.

11. The method according to claim 1, further comprising sending at least one notification message to at least one further motor vehicle or to at least one set of traffic lights while the motor vehicle is being guided in the fully automated manner to the target position, wherein at least one of the at least one further motor vehicle unit or the at least one set of traffic lights are controlled based at least in part on the at least one notification message.

12. A motor vehicle comprising a device on a side of the motor vehicle, the device comprising a computer and configured to:

determine state information relating to a state of an occupant of the motor vehicle;

determine whether medical help is needed for the occupant based on the state information;

transmit, based on a determination that medical help is needed, the state information together with a request for an indication that a release condition is met, wherein meeting the release condition is determined based on the state information;

receive an indication that the release condition is met, and a specified target position based on the release condition; and guide the motor vehicle in a fully automated manner to the specified target position upon receipt of the indication that the release condition is met;

wherein to guide the motor vehicle in the fully automated manner to the specified target position, the device is configured to guide the motor vehicle independent of at least one traffic regulation that restricts a driving mode of the motor vehicle, or guide the motor vehicle based at least in part on a modified version of the at least one traffic regulation.

* * * * *